US009155392B2

United States Patent
Baas

(10) Patent No.: US 9,155,392 B2
(45) Date of Patent: Oct. 13, 2015

(54) CASTOR APPARATUS FOR A CHAIR BASE AND A CHAIR BASE WITH A CASTOR APPARATUS

(71) Applicant: Royal Technologies Corporation, Hudsonville, MI (US)

(72) Inventor: James Henry Baas, Holland, MI (US)

(73) Assignee: Royal Technologies Corporation, Hudsonville, MI (US)

( * ) Notice: Subject to any disclaimer, the term of this patent is extended or adjusted under 35 U.S.C. 154(b) by 0 days.

(21) Appl. No.: 14/288,514

(22) Filed: May 28, 2014

(65) Prior Publication Data

US 2014/0353441 A1 Dec. 4, 2014

Related U.S. Application Data

(60) Provisional application No. 61/828,174, filed on May 28, 2013.

(51) Int. Cl.
*B60B 33/00* (2006.01)
*A47C 7/00* (2006.01)
*B60B 33/04* (2006.01)

(52) U.S. Cl.
CPC ............. *A47C 7/006* (2013.01); *B60B 33/0042* (2013.01); *B60B 33/0057* (2013.01); *B60B 33/0073* (2013.01); *B60B 33/045* (2013.01); *B60B 2200/222* (2013.01); *B60B 2900/212* (2013.01); *Y10T 16/1853* (2015.01)

(58) Field of Classification Search
CPC   B60B 33/00; B60B 33/0042; B60B 33/0049; B60B 33/0057; B60B 33/04; B60B 33/045
USPC ......... 248/188.1, 188.7, 346.01; 16/18 R, 45, 16/46, 47, 35 R, 35 D, 29
See application file for complete search history.

(56) References Cited

U.S. PATENT DOCUMENTS

| | | | | |
|---|---|---|---|---|
| 3,977,040 A * | 8/1976 | Sugasawara | ...................... | 16/45 |
| 6,637,072 B2 * | 10/2003 | Footitt et al. | .................. | 16/42 T |
| 8,302,257 B2 * | 11/2012 | Lin | .............................. | 16/35 R |
| 8,499,413 B1 * | 8/2013 | Tsai | .............................. | 16/35 R |
| 8,776,314 B2 * | 7/2014 | Hofrichter et al. | ............ | 16/35 R |
| 8,850,657 B1 * | 10/2014 | Yang | .............................. | 16/35 R |
| 8,910,344 B2 * | 12/2014 | Nguyen et al. | ................. | 16/18 B |

* cited by examiner

*Primary Examiner* — Todd M Epps
(74) *Attorney, Agent, or Firm* — The Watson I.P. Group, PLC; Jovan N. Jovanovic; Vladan M. Vasiljevic

(57) ABSTRACT

A castor apparatus having a body, a first wheel, a second wheel and an impact dissipation device. The castor apparatus can be positioned at the end of an arm of a chair base. The castor apparatus includes an impact dissipation device that redirects force transmitted through the arm and the castor onto the ground. A method is also disclosed.

14 Claims, 4 Drawing Sheets

CASTOR APPARATUS FOR A CHAIR BASE AND A CHAIR BASE WITH A CASTOR APPARATUS

CROSS-REFERENCE TO RELATED APPLICATION

This application claims priority from U.S. Provisional Patent App. Ser. No. 61/828,174 filed May 28, 2013, entitled Castor Apparatus For A Chair Base And A Chair Base With A Castor Apparatus, the entire specification of which is hereby incorporated by reference.

BACKGROUND OF THE DISCLOSURE

1. Field of the Disclosure

The invention relates in general to a chair assembly, and more particularly, to a castor apparatus which is usable with a chair base, as well as a chair base with a castor apparatus. The disclosure is particularly useful in an office chair environment, however, it is not limited thereto.

2. Background Art

The use of office chairs is ubiquitous. Generally, office chairs are configured to last for years. Many office chairs are coupled to a central column that is coupled to a chair base. The chair base includes a plurality of outwardly extending arms that terminate with a castor. The castors are positioned so that they can be rotated relative to the arm so that they can change rolling direction. This is particularly useful for quickly directing the chair in the direction desired. This is achieved by having the axle of the wheels of the castor being offset from the axle defining the rotation of the castor itself relative to the arm of the chair base.

While this ability of the castor to rotate is quite helpful when translating the chair across the ground, there are problems. Due to the offset, when a load is applied to the chair, the castor is directed outwardly as the axis of rotation of the wheels is offset from the axis of rotation of the castor vis-à-vis the arm. The outward force can be quite large when the load increases, and, so much so that the castor can break off from the arm, or the arm can break itself.

SUMMARY OF THE DISCLOSURE

The disclosure is directed to a castor apparatus comprising a body, a first wheel, a second wheel, a castor bore pin and an impact dissipation device. The body has a central region, a first side and a second side. The body includes a first axis extending from the first side through the second side. A transverse axis that is perpendicular to the first axis extends through the central region between the first side and the second side. The first wheel is positioned on the first side of the body and rotatably coupled to the central region of the body. The first wheel rotates about an axle corresponding to the first axis. The second wheel is positioned on the second side of the body and is rotatably coupled to the central region of the body. The second wheel rotates about the axle corresponding to the first axis. The castor bore pin extends from the body and corresponds to the transverse axis. The impact dissipation device includes a body having a proximal end that extends in a direction opposite the castor bore pin and that extends along the transverse axis in a direction opposite the castor bore pin. The distal end terminates short of the lowermost position of the first wheel and second wheel. As such, when on an outside surface, without a loading, the distal end of the impact dissipation device is spaced apart from the surface.

In some examples, the castor bore pin is rotatable about the transverse axis.

In some examples, the transverse axis is substantially vertical with the first axis being substantially horizontal.

In some examples, the body of the castor apparatus comprises a substantially cylindrical member having an axial circumferential surface.

In some examples, a distance between the distal end of the impact dissipation device and the lowermost position of the first and second wheels is between one sixteenth of an inch and three quarters of an inch. In some examples, the distance is between one sixteenth of an inch and three eights of an inch.

In some examples, the impact dissipation device has a substantially cylindrical configuration.

In another aspect of the disclosure, the disclosure is directed to a chair base. The chair base includes a central hub, a plurality of arms and a plurality of castor apparatuses. The plurality of arms extend from the central hub radially outwardly. Each of the plurality of arms having a distal end and a proximal end. The proximal end is coupled to the central hub. A castor bore is positioned at the distal end thereof of each of the arms. At least one of the castor apparatuses is positioned within the castor bore of each of the plurality of arms. At least one of the plurality of castor apparatuses comprising a body, a first wheel, a second wheel, a castor bore pin and an impact dissipation device. The body has a central region, a first side and a second side. The body includes a first axis extending from the first side through the second side. A transverse axis that is perpendicular to the first axis extends through the central region between the first side and the second side. The first wheel is positioned on the first side of the body and rotatably coupled to the central region of the body. The first wheel rotates about an axle corresponding to the first axis. The second wheel is positioned on the second side of the body and is rotatably coupled to the central region of the body. The second wheel rotates about the axle corresponding to the first axis. The castor bore pin extends from the body and corresponds to the transverse axis. The impact dissipation device includes a body having a proximal end that extends in a direction opposite the castor bore pin and that extends along the transverse axis in a direction opposite the castor bore pin. The distal end terminates short of the lowermost position of the first wheel and second wheel. As such, when on an outside surface, without a loading, the distal end of the impact dissipation device is spaced apart from the surface.

In some examples, each of the castor apparatuses are substantially identical to each other.

In some examples, the plurality of arms comprises five arms.

In some examples, the castor bore is substantially parallel to a bore of the central hub.

In another aspect of the disclosure, the disclosure is directed to a method of dissipating an impact. The method comprises the steps of providing a chair base including a central hub and a plurality of arms extending radially outwardly therefrom, with a castor bore positioned at a distal end of each of the plurality of arms; providing a castor apparatus within each castor bore of each arm, the castor apparatus having a body with a central region, a first wheel and a second wheel extending on opposing sides of the central region and rotating on a first axis extending through the body, and a castor bore pin extending into the castor bore of each arm, the castor bore pin extending along a transverse axis that is perpendicular to the first axis and spaced apart therefrom, and an impact dissipating device extending along the transverse axis in a direction opposite of the castor bore pin; positioning the chair base on an outside surface with the first and second wheels of each castor apparatus contacting the outside surface, and a distal end of the impact dissipating device being spaced apart from the outside surface; imparting a force on the chair base that is transferred to each castor apparatus; deflecting the castor apparatus in a direction other than along the transverse axis so as to direct the distal end of the impact dissipation device toward the outside surface; and allowing the distal end of the impact dissipation device to contact the outside surface prior to damage to either one of the castor bore or the castor apparatus.

In some examples, a distance between the distal end of the impact dissipation device and the lowermost position of the first and second wheels is between one sixteenth of an inch and three quarters of an inch. In some examples, the distance is between one sixteenth of an inch and three eights of an inch.

BRIEF DESCRIPTION OF THE DRAWINGS

The disclosure will now be described with reference to the drawings wherein.

DETAILED DESCRIPTION OF THE DISCLOSURE

Figure 1:
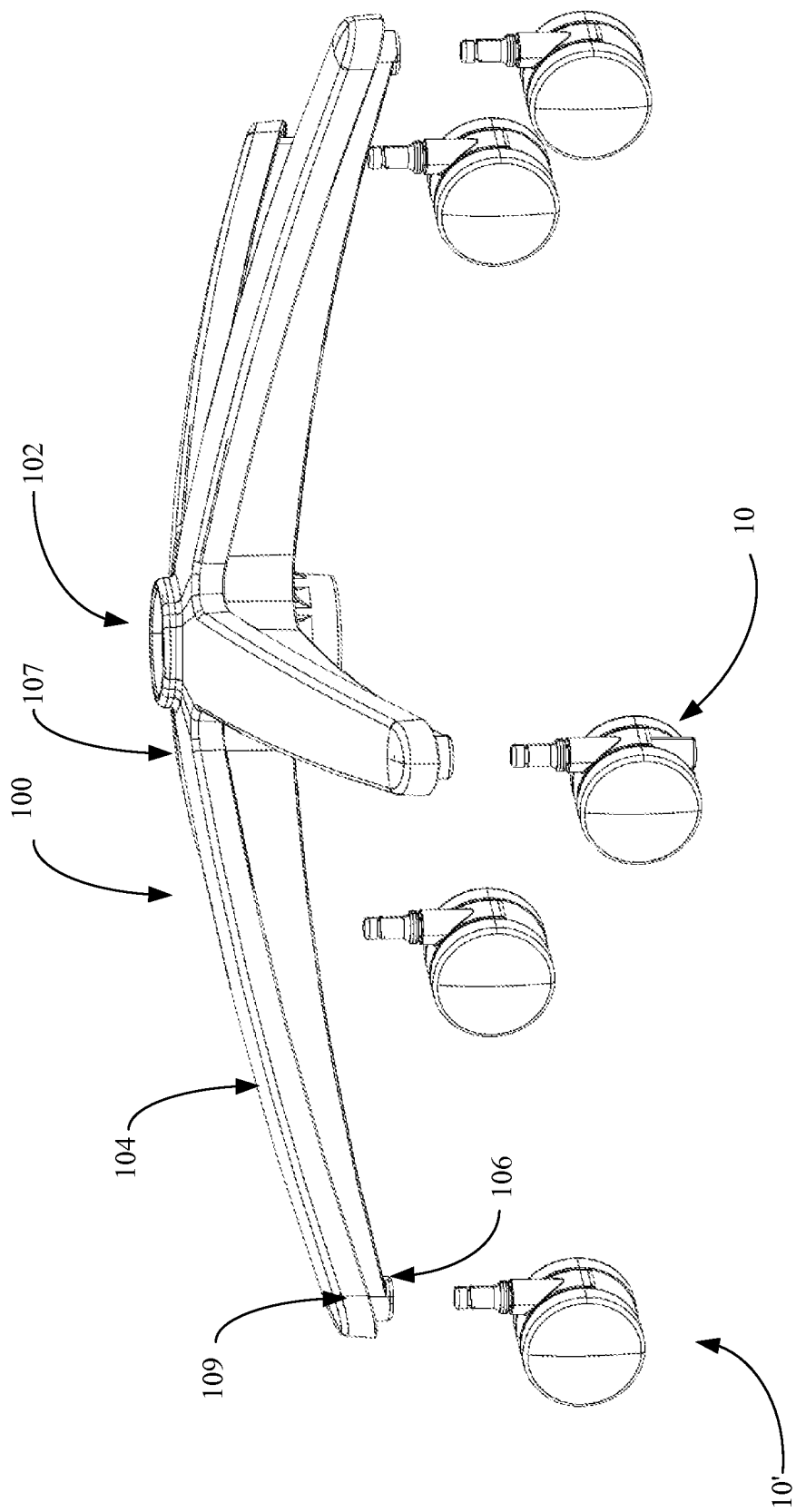
FIG. 1 of the drawings is an exploded perspective view of a chair base having a plurality of castors, including a castor apparatus of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the castor apparatus of the present disclosure is shown generally at 10. The castor apparatus 10 is configured for use in association with chair base 100. The chair base 100 comprises a generically known base that can be coupled to an office chair (not shown) or the like. The castor apparatus is not limited to use in association with the particular chair base or any other particular chair base. The chair base shown is merely exemplary of an environment in which the castor apparatus of the present disclosure can be utilized.

The chair base 100 as is shown in FIG. 1 includes central hub 102, and, arms, such as arm 104. The central hub 102 includes an opening extending therethrough which is configured to accept a cylinder (generally pneumatic) that supports the remainder of the chair. A plurality of arms, such as arm 104 extend outwardly from the central hub, generally perpendicular thereto, spaced apart a particular arcuate distance. In the embodiment shown, a total of five arms are disclosed. It will be understood that in other embodiments, a greater or lesser number of arms may be utilized. In the embodiment shown, each of the arms are substantially identical. Thus, the arm 104 will be described with the understanding that the remaining arms are substantially identical.

Arm 104 includes proximal end 107 and distal end 109. The arm 104 tends to be thicker at the hub, and tapers toward the distal end. In addition, a castor bore 106 is positioned at the distal end. The castor bore is typically configured to be substantially vertically oriented. The bore may extend only partially into the arm, or may extend all the way through the arm so as to be visible from the top. Generally, the castor bore and the central hub opening are both vertical, and thus substantially parallel to each other.

The castor apparatus 10 is shown as being positionable at the distal end of each one of the arms. In the embodiment shown in FIG. 1, a single castor apparatus of the present invention is shown with a plurality of conventional castors coupled to the remaining arms. It will be understood that in different embodiments, each one of the arms may be associated with a castor of the type disclosed in the present disclosure. In other embodiments, fewer than all of the castors may be of the type disclosed in the present disclosure.

Figure 6:
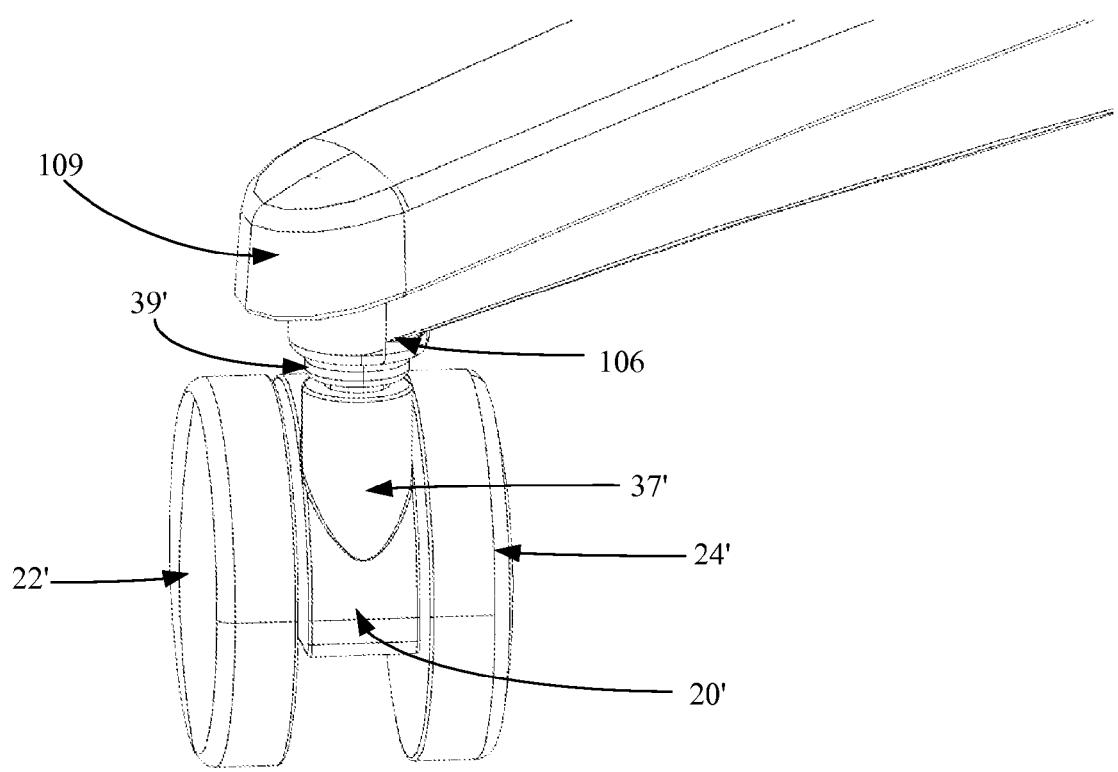
FIG. 6 of the drawings is a partial perspective view of the chair base showing a conventional castor of the prior art.

The castor apparatus 10 is shown in greater detail in FIGS. 2 through 5 as comprising body 20, first wheel 22, second wheel 24 and impact dissipation device 26. A conventional caster without the impact dissipation device is shown in FIG. 6, wherein like structures are shown with the same reference numbers, augmented by a prime ('). The body includes central region 30, first side 32, second side 34 and axial circumferential/perimeter surface 36. While a number of different configurations are contemplated, the body generally comprises a cylindrical member with the first and second sides being substantially circular in configuration. The axial circumferential/perimeter surface 36 includes a width that can be varied depending on the particularly desired configuration.

A central axis 35 corresponds, in the embodiment shown, to the center of the circle defined by the first side 32 and the second side 34 and defines the axis of rotation of the wheels 22, 24. The central axis is generally parallel to the cylindrical configuration of the axial surface 36.

A second axis is disposed on the body. This, second axis, is referred to as an offset transverse axis 37 that extends substantially vertically from the body 20. The offset transverse axis 37 may comprise an axis that is tangential to the surface of the axial surface 36, or that may comprise a chord that extends through the central region (wherein the body comprises a different shape, other than a circle, the offset transverse axis extends in a spaced apart relationship to the central axis 35 and is substantially parallel thereto). The amount of the offset from the central axis can be varied depending on the other dimensions of the components. It is the offset that allows (or provides for) the rotation of the castor relative to the arms about the second axis.

A castor bore pin 39 extends vertically from the offset transverse axis. Depending on the configuration, the castor bore pin 39 may be rotatably coupled to the offset transverse axis 37 so that the remainder of the body 20 can rotate relative to the castor bore pin 39. In other embodiments, the castor bore pin may include a surface configuration which allows relative rotation of the castor bore pin relative to the arm (and together with the body). In still other embodiments, the castor bore pin can rotate relative to the arm and relative to the body of the castor apparatus. Generally, the castor bore pin 39 extends substantially vertically, although other configurations are contemplated.

The first wheel 22 comprises a generally circular member with an axle (or hub) 40 that matingly engages with the central axis 35 on the first side 32 of the body 20 so as to rotate about the same. The first wheel 22 is generally sized so as to be slightly larger than the castor body so that the castor body is maintained above the ground and generally not in contact therewith. The first wheel 22 may include an outer surface configuration, or a material about the outer surface which promotes traction and the like.

The second wheel 24 is substantially identical to the first wheel 22 (i.e., a mirror image thereof about the second side 34 of the body 20 so as to rotate about the same. The second wheel includes axle (or hub) 41 which substantially matches with the central axis 35 on the second side 34. The second wheel may include similar surface configurations and/or materials as the first wheel to promote traction. Typically, the first and second wheels have an identical outer perimeter such that the rolling distance of each is substantially identical.

Figure 2:
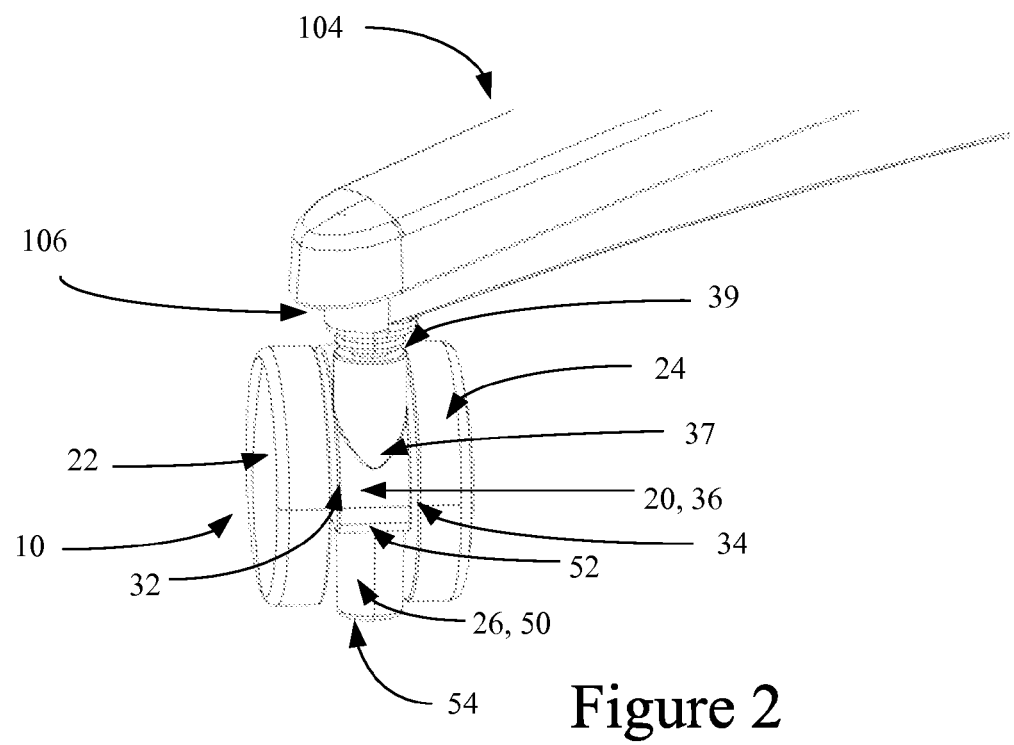
FIG. 2 of the drawings is a partial perspective view of the chair base showing a castor apparatus of the present disclosure.
Figure 3:
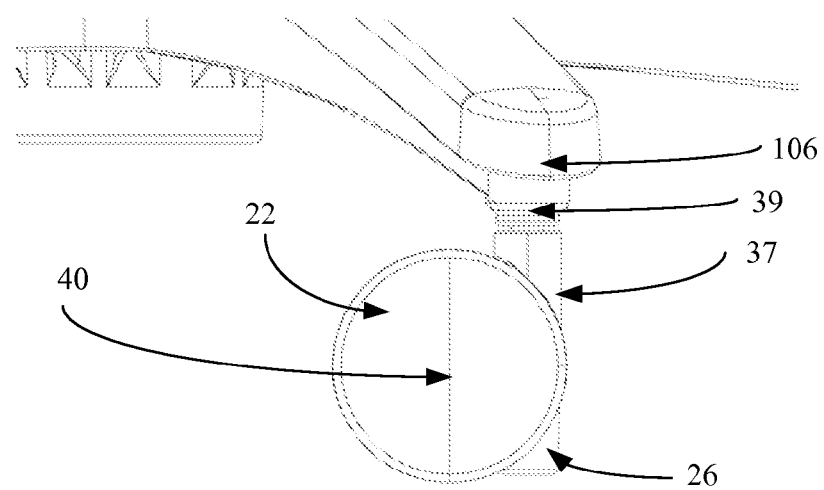
FIG. 3 of the drawings is a partial perspective view of the chair base showing a side elevational view of the castor apparatus of the present disclosure.
Figure 4:
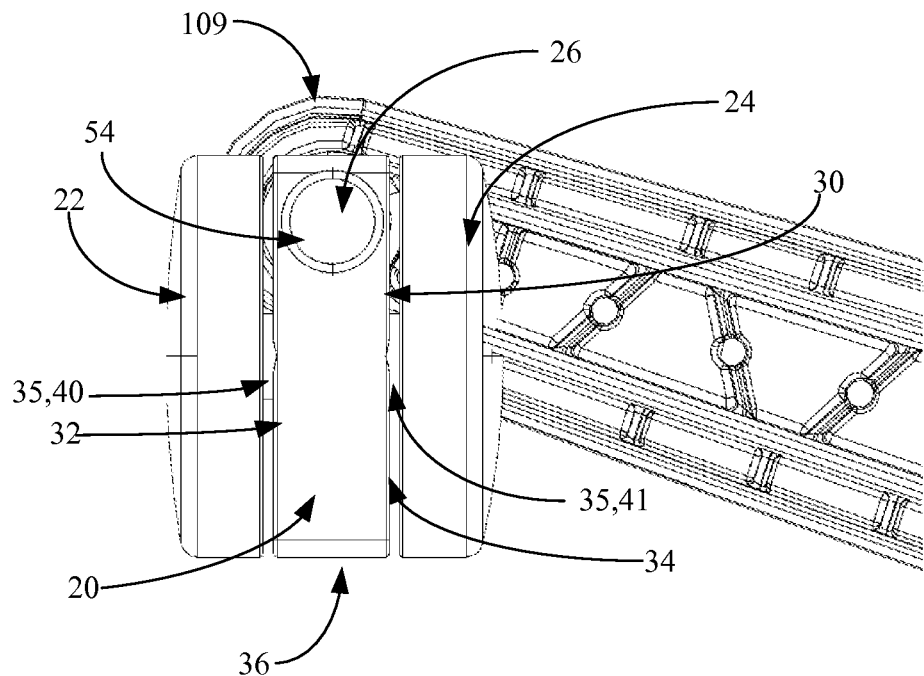
FIG. 4 of the drawings is a bottom plan view of the chair base with the castor apparatus of the present disclosure.
Figure 5:
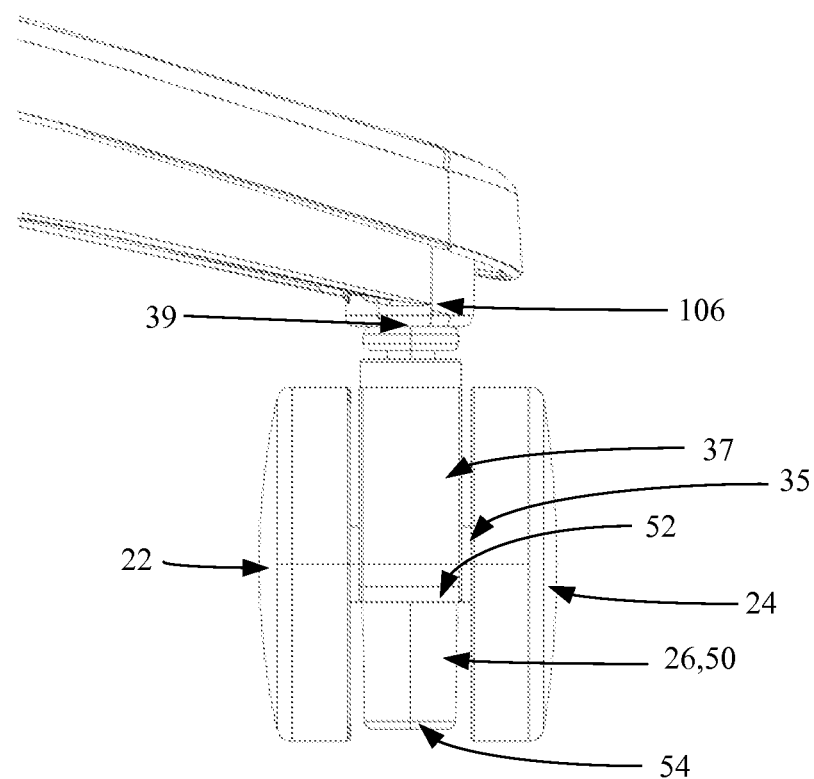
FIG. 5 of the drawings is a partial perspective view of the chair base, showing a front elevational view of the chair base with the castor apparatus of the present disclosure.

The impact dissipation device 26 is shown in FIG. 2 as comprising body 50 that includes proximal end 52 and distal end 54. The proximal end 52 is configured to interface with the offset transverse axis 37 opposite the castor bore pin 39 and extending to the distal end which is spaced apart from the surface upon which the castor apparatus rolls. That is, there is a distance between the distal end of the impact dissipation device and the outer perimeter of the first and second wheel at its lowest point. The same axis goes through each of the castor bore pin 39 and the impact dissipation device such that they are substantially coaxial. The distal end of the impact dissipation device is spaced apart from the ground as it terminates prior to the lowermost position of the first wheel and the second wheel. It is contemplated that the distance between the distal end and the lowest position of the first wheel and the second wheel is between one sixteenth of an inch and three quarters of an inch. Preferably, the distance is between one sixteenth of an inch and three eights of an inch.

In operation, the castor apparatus 10 is coupled to a chair base by insertion of the castor bore pin 39 into the castor bore 106 positioned at the distal end 109 of arm 104 (and each one of the arms). The castor apparatus is configured to freely rotate about the offset transverse axis 37 and the castor bore 106.

Problematically, the offset transverse axis 37 is offset from the central axis 35 (i.e., the axis about which the wheels rotate). That is, the first and second wheels 22, 24 contact the ground below the central axis 35 which is offset from the offset transverse axis 37 by a distance (generally a bit less than the radius of the wheels. As such, when a large load is placed on the chair (not shown) the load is imparted through the arms 104 of the chair base and through the castor bore pin through the wheels to the ground. With the offset, a rotational moment is imparted onto the castor apparatus, and the castor apparatus will swing outwardly in the direction of the central axis. That is, the castor bore pin experiences a transverse rotation that is generally perpendicular to the axis of rotation.

With a significant load, the castor bore pin tends to break through the arm 104 at the distal end 109, or the castor apparatus breaks at the offset transverse axis. To compensate for the same, it is often the case that the arms are strengthened or that the castor bore pin/bore assembly is made larger to accommodate additional force.

With the present disclosure, the impact dissipation device very quickly reorients the force to be straight below the offset transverse axis, thereby eliminating the torsional load, or movement that is created by the offset nature of the wheel axles. In more detail, as a large load is placed on the chair, the arms 104 transfer the force onto each castor apparatus. As the force is transferred, the castors will tend to rotate outwardly displacing the transverse axis and the castor bore pin relative to the castor bore 106, or to compress downwardly. This rotative or compressive movement will place the impact dissipation device 20 (the distal end 54 thereof) into contact with the surface upon which the chair is positioned (i.e., floor), prior to damaging the castor bore or the castor bore pin (and preferably with only an elastic deformation of the components of the castor apparatus or the castor bore). Thus, the movement that is defined by the offset nature of the central axis relative to the offset transverse axis no longer controls the direction of the force, and the force is directed straight down through the castor bore, the castor bore pin, the offset transverse axis, and the impact dissipation device to the ground. In other words, the imparted force on the chair base is transferred to each castor apparatus. This results in a deflecting of the castor apparatus in a direction other than along the transverse axis so as to direct the distal end of the impact dissipation device toward the outside surface. If the force is high enough, the distal end of the impact dissipation device to contact the outside surface prior to damage to either one of the castor bore or the castor apparatus.

Without the aforementioned movement, the castor apparatus is no longer forced outwardly. In turn, there is virtually no outward, destructive force on the castor bore 106, nor on the offset transverse axis. Thus, the components, as built, can withstand a substantially large force applied onto the chair. In turn, it may also be possible to reduce the amount of material utilized for the chair base and the castors (which are configured to accept the offset force).

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A castor apparatus comprising:
    a body having a central region, a first side and a second side, the body including a first axis extending from the first side through the second side, and a transverse axis that is perpendicular to the first axis and extending through the central region between the first side and the second side;
    a first wheel positioned on the first side of the body rotatably coupled to the central region of the body and rotating about an axle corresponding to the first axis;
    a second wheel positioned on the second side of the body rotatably coupled to the central region of the body and rotating about the axle corresponding to the first axis;
    a castor bore pin extending from the body and corresponding to the transverse axis; and
    an impact dissipation device including a body having a proximal end extending in a direction opposite the castor bore pin and extending along the transverse axis in a direction opposite of the castor bore pin, with a distal end terminating short of a lowermost position of the first wheel and second wheel, so that when on an outside surface, without a loading, the distal end of the impact dissipation device is spaced apart from the outside surface.

2. The castor apparatus of claim 1 wherein the castor bore pin is rotatable about the transverse axis.

3. The castor apparatus of claim 1 wherein the transverse axis is substantially vertical with the first axis being substantially horizontal.

4. The castor apparatus of claim 1 wherein the body of the castor apparatus comprises a substantially cylindrical member having an axial circumferential surface.

5. The castor apparatus of claim 1 wherein, a distance between the distal end of the impact dissipation device and the lowermost position of the first and second wheels is between one sixteenth of an inch and three quarters of an inch.

6. The castor apparatus of claim 5 wherein the distance is between one sixteenth of an inch and three eights of an inch.

7. The castor apparatus of claim 5 wherein the impact dissipation device has a substantially cylindrical configuration.

8. A chair base comprising:
a central hub;
a plurality of arms extending from the central hub radially outwardly, each of the plurality of arms having a distal end and a proximal end, the proximal end coupled to the central hub, with a castor bore positioned at the distal end thereof;
a plurality of castor apparatuses, with one of the plurality of castor apparatuses positioned within the castor bore of each of the plurality of arms, at least one of the plurality of castor apparatus comprising:
a body having a central region, a first side and a second side, the body including a first axis extending from the first side through the second side, and a transverse axis that is perpendicular to the first axis and extending through the central region between the first side and the second side;
a first wheel positioned on the first side of the body rotatably coupled to the central region of the body and rotating about an axle corresponding to the first axis;
a second wheel positioned on the second side of the body rotatably coupled to the central region of the body and rotating about the axle corresponding to the first axis;
a castor bore pin extending from the body and corresponding to the transverse axis; and
an impact dissipation device including a body having a proximal end extending in a direction opposite the castor bore pin and extending along the transverse axis in a direction opposite of the castor bore pin, with a distal end terminating short of a lowermost position of the first wheel and second wheel, so that when on an outside surface, without a loading, the distal end of the impact dissipation device is spaced apart from the outside surface.

9. The chair base of claim 8 wherein each of the castor apparatuses are substantially identical to each other.

10. The chair base of claim 8 wherein the plurality of arms comprises five arms.

11. The chair base of claim 8 wherein the castor bore is substantially parallel to a bore of the central hub.

12. A method of dissipating an impact comprising:
providing a chair base including a central hub and a plurality of arms extending radially outwardly therefrom, with a castor bore positioned at a distal end of each of the plurality of arms;
providing a castor apparatus within each castor bore of each arm, the castor apparatus having a body with a central region, a first wheel and a second wheel extending on opposing sides of the central region and rotating on a first axis extending through the body, and a castor bore pin extending into the castor bore of each arm, the castor bore pin extending along a transverse axis that is perpendicular to the first axis and spaced apart therefrom, and an impact dissipating device extending along the transverse axis in a direction opposite of the castor bore pin;
positioning the chair base on an outside surface with the first and second wheels of each castor apparatus contacting an outside surface, and a distal end of the impact dissipating device being spaced apart from the outside surface;
imparting a force on the chair base that is transferred to each castor apparatus;
deflecting the castor apparatus in a direction other than along the transverse axis so as to direct the distal end of the impact dissipation device toward the outside surface; and
allowing the distal end of the impact dissipation device to contact the outside surface prior to damage to either one of the castor bore or the castor apparatus.

13. The method of claim 12 wherein the step of positioning the chair base on the outside surface renders a distance between the distal end of the impact dissipation device and a lowermost position of the first and second wheels is between one sixteenth of an inch and three quarters of an inch.

14. The method of claim 13 wherein the distance is between one sixteenth of an inch and three eights of an inch.

* * * * *